US010191228B2

(12) United States Patent
Isenhour et al.

(10) Patent No.: US 10,191,228 B2
(45) Date of Patent: Jan. 29, 2019

(54) OPTICAL CONNECTORS AND COMPLIMENTARY OPTICAL RECEPTACLES HAVING MAGNETIC ATTACHMENT

(71) Applicant: Corning Optical Communications LLC, Hickory, NC (US)

(72) Inventors: Micah Colen Isenhour, Lincolnton, NC (US); Christopher Paul Lewallen, Hudson, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/460,315

(22) Filed: Mar. 16, 2017

(65) Prior Publication Data
US 2017/0184801 A1 Jun. 29, 2017

Related U.S. Application Data

(63) Continuation of application No. PCT/US2015/050927, filed on Sep. 18, 2015.
(Continued)

(51) Int. Cl.
*G02B 6/36* (2006.01)
*G02B 6/38* (2006.01)
*G02B 6/42* (2006.01)

(52) U.S. Cl.
CPC .......... *G02B 6/3886* (2013.01); *G02B 6/389* (2013.01); *G02B 6/3817* (2013.01);
(Continued)

(58) Field of Classification Search
CPC .. G02B 6/4292; G02B 6/4204; G02B 6/4214; G02B 6/4246; G02B 6/36; G02B 6/32
See application file for complete search history.

(56) References Cited

U.S. PATENT DOCUMENTS 4,213,677 A 7/1980 Sugimoto et al.
4,268,112 A 5/1981 Peterson
(Continued)

FOREIGN PATENT DOCUMENTS

AU 199898138 B2 8/1999
EP 258569 A2 3/1988
(Continued)

OTHER PUBLICATIONS

Chanclou et al; "Design and Demonstration of a Multicore Single-Mode Fiber Coupled Lens Device"; Optics Communications, 233 (2004) 333-339.
(Continued)

*Primary Examiner* — Jennifer Doan
(74) *Attorney, Agent, or Firm* — Michael E. Carroll, Jr.

(57) ABSTRACT

Disclosed are optical connectors and methods for making the same. In one embodiment, the optical connector comprises an optical body, one or more first magnetic materials attached to the optical body, a housing, and one or more second magnetic materials attached to the housing. The first magnetic material(s) provide alignment with an optical element of a complimentary receptacle and the optical body may include one or more openings for receiving the first magnetic materials. The second magnetic material(s) attached to the housing provide retention of the optical connector with the complimentary receptacle when mated together. Consequently, the optical connector allows for quick and easy assembly along with a robust structure for a large number of mating/unmating cycles. In other embodiments, the optical devices disclosed may further include one or more electrical contacts for making a hybrid connection or have a TIR surface integrated into a portion of a housing.

34 Claims, 8 Drawing Sheets

Related U.S. Application Data (60) Provisional application No. 62/053,980, filed on Sep. 23, 2014.

(52) U.S. Cl.
CPC ......... G02B 6/4214 (2013.01); G02B 6/4292 (2013.01); *G02B 6/382* (2013.01); *G02B 6/3861* (2013.01); *G02B 6/3885* (2013.01)

(56) References Cited

U.S. PATENT DOCUMENTS

| | | | |
|---|---|---|---|
| 4,636,032 | A | 1/1987 | Grego |
| 4,641,915 | A | 2/1987 | Asakawa et al. |
| 4,701,011 | A | 10/1987 | Emkey et al. |
| 4,844,582 | A | 7/1989 | Giannini |
| 5,085,062 | A | 2/1992 | Capdevila |
| 5,168,537 | A | 12/1992 | Rajasekharan et al. |
| 5,172,271 | A | 12/1992 | Sinclair |
| 5,384,874 | A | 1/1995 | Hirai et al. |
| 5,784,512 | A | 7/1998 | Hensen |
| 5,832,153 | A | 11/1998 | Duck |
| 5,850,493 | A | 12/1998 | Cheng |
| 5,923,802 | A | 7/1999 | Giebel et al. |
| 5,957,717 | A * | 9/1999 | Monsef ................ G01C 15/02 33/293 |
| 6,012,852 | A | 1/2000 | Kadar-Kallen et al. |
| 6,033,125 | A | 3/2000 | Stillie et al. |
| 6,086,265 | A | 7/2000 | Kuribayashi et al. |
| 6,157,485 | A | 12/2000 | Cheng |
| 6,246,026 | B1 | 6/2001 | Vergeest |
| 6,328,484 | B1 | 12/2001 | Uebbing |
| 6,542,665 | B2 | 4/2003 | Reed et al. |
| 6,632,025 | B2 | 10/2003 | Ukrainczyk |
| 6,655,850 | B2 | 12/2003 | Mann et al. |
| 6,687,434 | B2 | 2/2004 | Ishikawa |
| 6,736,547 | B2 | 5/2004 | Stevens et al. |
| 6,837,625 | B2 | 1/2005 | Schott et al. |
| 6,899,464 | B2 | 5/2005 | Stevens et al. |
| 6,963,687 | B2 | 11/2005 | Vergeest et al. |
| 7,077,576 | B2 | 7/2006 | Luther et al. |
| 7,103,698 | B2 | 9/2006 | Zhang et al. |
| 7,311,526 | B2 | 12/2007 | Rohrbach et al. |
| 7,329,050 | B1 | 2/2008 | Dugan et al. |
| 7,346,236 | B2 | 3/2008 | Asano et al. |
| 7,346,237 | B2 | 3/2008 | Matsumura et al. |
| 7,346,240 | B1 | 3/2008 | He et al. |
| 7,357,005 | B2 | 4/2008 | Matsumura et al. |
| 7,399,125 | B1 | 7/2008 | Whaley et al. |
| 7,460,750 | B2 | 12/2008 | Durrant et al. |
| 7,522,793 | B2 | 4/2009 | Drabarek et al. |
| 7,572,071 | B1 | 8/2009 | Wu |
| 7,603,008 | B2 | 10/2009 | Matsumura et al. |
| 7,630,593 | B2 | 12/2009 | Furuno et al. |
| 7,817,006 | B2 | 10/2010 | Fullerton et al. |
| 7,834,729 | B2 | 11/2010 | Fullerton et al. |
| 7,841,776 | B2 | 11/2010 | DiFonzo et al. |
| 8,315,492 | B2 | 11/2012 | Chen et al. |
| 9,164,246 | B2 | 10/2015 | Isenhour et al. |
| 9,568,678 | B2 | 2/2017 | Isenhour et al. |
| 2003/0012496 | A1 | 1/2003 | Yamagata et al. |
| 2003/0053195 | A1 | 3/2003 | Chen et al. |
| 2004/0033016 | A1 | 2/2004 | Kropp |
| 2004/0114866 | A1 | 6/2004 | Hiramatsu |
| 2004/0202477 | A1 | 10/2004 | Nagasaka |
| 2005/0175347 | A1 | 8/2005 | Ray et al. |
| 2006/0072878 | A1 | 4/2006 | Dames et al. |
| 2006/0093270 | A1 | 5/2006 | Fenwick et al. |
| 2008/0122579 | A1 | 5/2008 | German et al. |
| 2008/0219616 | A1 | 9/2008 | Wimberger-Friedl et al. |
| 2008/0226228 | A1 | 9/2008 | Tamura et al. |
| 2009/0202252 | A1 | 8/2009 | Sunaga et al. |
| 2009/0251256 | A1 | 10/2009 | Fullerton et al. |
| 2010/0028563 | A1 | 2/2010 | Ota |
| 2010/0080563 | A1 | 4/2010 | Difonzo et al. |
| 2010/0195956 | A1 | 8/2010 | Zhang et al. |
| 2010/0225430 | A1 | 9/2010 | Fullerton et al. |
| 2010/0278490 | A1 | 11/2010 | Liao et al. |
| 2011/0038582 | A1 | 2/2011 | DiFonzo et al. |
| 2011/0123151 | A1 | 5/2011 | Zbinden et al. |
| 2011/0305417 | A1 | 12/2011 | Wang et al. |
| 2012/0002914 | A1 | 1/2012 | Kroemer et al. |
| 2012/0007705 | A1 | 1/2012 | Fullerton et al. |
| 2012/0021619 | A1 | 1/2012 | Bilbrey et al. |
| 2012/0155803 | A1 | 6/2012 | Benjamin et al. |
| 2012/0195556 | A1 | 8/2012 | Wang et al. |
| 2012/0213475 | A1 | 8/2012 | Selli et al. |
| 2013/0089290 | A1 | 4/2013 | Sloey et al. |
| 2013/0183000 | A1 | 7/2013 | Erdman et al. |
| 2013/0259419 | A1 | 10/2013 | Charbonneau-Lefort |
| 2013/0259423 | A1 | 10/2013 | Charbonneau-Lefort |
| 2013/0259431 | A1 | 10/2013 | Charbonneau-Lefort et al. |
| 2014/0112623 | A1* | 4/2014 | Bradley ............... G02B 6/4293 385/79 |
| 2014/0112627 | A1 | 4/2014 | Isenhour et al. |
| 2014/0205235 | A1 | 7/2014 | Benjamin et al. |
| 2017/0184801 | A1* | 6/2017 | Isenhour ............. G02B 6/3886 |

FOREIGN PATENT DOCUMENTS

| | | |
|---|---|---|
| EP | 1447695 A2 | 8/2004 |
| GB | 2469714 B | 5/2014 |
| JP | 58209705 A | 12/1983 |
| JP | 5937511 A | 3/1984 |
| JP | 63293510 A | 11/1988 |
| JP | 1997318852 | 12/1997 |
| WO | 0074277 A1 | 12/2000 |
| WO | 0111409 A2 | 2/2001 |
| WO | 03076993 A1 | 9/2003 |
| WO | 2008058505 A1 | 5/2008 |
| WO | 2012064594 A1 | 5/2012 |

OTHER PUBLICATIONS

Cusworth et al; "Angular Tilt Misalignment Loss At a Grin Rod Lens Coupler"; Applied Optics; vol. 25, No. 11; Jun. 1, 1986; p. 1775-1779.

Emkey et al; "Analysis: and Evaluation of Graded-Index Fiber-Lenses"; Journal of Lightwave Technology, vol. LT-5, No. 9 Sep. 1987; pp. 1156-1164.

Gilsdorf et al: "Single-Mode Fiber Coupling Efficiency With Graded-Index Rod Lenses"; Applied Optics; vol. 33, No. 16; Jun. 1, 1994; pp. 3440-3445.

Gradient-Index Lenses; Optical Components; Melles Griot; www.cvimellesgroit.com; 4 Pages, Date Unknown.

Palais; "Fiber Coupling Using Graded-Index Rod Lenses"; Applied Optics, vol. 19, No. 12, Jun. 15, 1980 pp. 2011-2018.

Senior et al; "Misalignment Losses At Multimode Graded-Index Fiber, Splices and Grin Rod Lens Couplers"; Applied Optics; vol. 24, No. 7; Apr. 1, 1985; p. 977-983.

Tomlinson: "Applications of Grin-Rod Lenses in Optical Fiber Communication Systems"; Applied Optics, vol. 19, No. 7; Apr. 1, 1980; pp. 1127-1138.

Patent Cooperation Treaty, International Search Report and Written Opinion for PCT/US2015/050927, dated Nov. 24, 2015, 11 pages.

Patently Apple, "Apple Introduces Us to the Wild World of Coded Magnets," Jan. 26, 2012, http://www.patentlyapple.com/patently-apple/2012/01/apple-introduces-us-to-the-wild-world-of-coded-magnets.html.

* cited by examiner

OPTICAL CONNECTORS AND COMPLIMENTARY OPTICAL RECEPTACLES HAVING MAGNETIC ATTACHMENT

PRIORITY APPLICATION

This application is a continuation of International Application No. PCT/US2015/50927, filed on Sep. 18, 2015, which claims the benefit of priority under 35 U.S.C. § 119 of U.S. Provisional Application Ser. No. 62/053,980, filed on Sep. 23, 2014, the content of which is relied upon and incorporated herein by reference in its entirety.

FIELD

The disclosure is directed to an optical connectors and complimentary optical receptacles for making an optical connection between a cable assembly and an electronic device. More specifically, the disclosure is directed to optical connectors and complimentary optical receptacles having at least one optical channel and one or more magnet materials.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, televisions, high-definition displays, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, with flat-panel displays and televisions that are closely mounted to a wall it may be desirable to have a blind mating capability for an optical connection without damaging the optical interface. Additionally, devices such as smart phones, laptops and tablets are exposed to rough handling and harsh environments and the consumer will expect optical connectivity to handle these demanding conditions. Further, these types of devices may require a large number of mating/unmating cycles during their lifetime.

Thus, there is an unresolved need for optical connectors and optical receptacles in consumer devices and other devices that can accommodate blind mating requirements along with the potential for harsh treatment in a consumer environment along with the potential for a large number of mating/unmating cycles expected during the lifetime of the electronic device.

SUMMARY

One embodiment the disclosure is directed to an optical device comprising an optical body comprising at least one optical channel having an optical interface portion, a total internal reflection (TIR) surface for turning the optical signal of the at least one optical channel, and at least one fiber lead-in aligned to the TIR surface. The optical body forms a portion of the housing for directly mating with a complimentary device. Thus, the optical device has few components since the TIR surface is integrated into a portion of the housing and there is no need to align and individual TIR component to the housing. The optical device may be an optical connector such as a plug, a receptacle of the like and may comprise one or more of the features disclosed herein.

In another embodiment, the disclosure is directed to an optical connector comprising an optical body, one or more first magnetic materials, a housing and one or more second magnetic materials. The optical body comprises at least one optical channel having an optical interface portion, a total internal reflection surface (TIR) surface for turning the optical signal of the at least one optical channel, and at least one fiber lead-in aligned to the TIR surface. The one or more first magnetic materials are attached to the optical body and the one or more second magnetic materials are attached to the housing. The optical connector can include other optical features or structure such as the housing having second magnet recesses, the housing having alignment features, or having electrical contacts for making a hybrid connector.

In one embodiment, the disclosure is directed to an optical receptacle comprising a receptacle optical body, one or more first magnetic materials, a housing and one or more second magnetic materials. The receptacle optical body comprises at least one optical channel having an optical interface portion. The one or more first magnetic materials are attached to the receptacle optical body and the one or more second magnetic materials are attached to the housing. The optical receptacle can include other optical features or structure such as the housing having second magnet recesses, the housing having alignment features, or having electrical contacts for making a hybrid connector.

The first magnetic materials may be attached to the optical body of the optical connector or optical receptacle in any suitable arrangement or manner. If desired, the optical body may include one or more openings for receiving and securing one or more of the first magnetic materials. The one or more openings may be located on any suitable side of the optical body as desired. The first magnetic materials provide optical alignment with a complimentary device having an optical interface. Consequently, the optical connectors and optical receptacles allow for quick and easy connection and are easy to manufacture. Further, the optical devices provide a robust structure for a large number of mating/unmating cycles if required. In other embodiments, the optical connectors and optical receptacles disclosed may further include one or more electrical contacts for making a hybrid connection.

The disclosure is also directed to method for making an optical device. One explanatory method of making optical devices such as optical connectors or optical receptacles according to the concepts disclosed. One explanatory method of making an optical device comprises providing an optical body comprising at least one optical channel with an optical interface portion, providing one or more first magnetic materials, attaching one or more of the first magnetic materials to the optical body, providing a housing and one or more second magnetic materials, and attaching the one or more second magnetic materials to a portion of the housing. The method may also optionally include the step of providing a housing with one or more alignment features, attaching one or more electrical contacts to the optical body, and/or having the optical body being a portion of an optical connector or an optical receptacle. Additionally, the method may also optionally further include the step of providing a housing having one or more second magnet recesses.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The optical devices such as optical connectors and optical receptacles are disclosed herein that enable high-speed data applications for transmitting optical signals to and from electronic devices. In other embodiments, the optical connectors and optical receptacles can have hybrid connections for transmitting optical and electrical signals and/or electrical power over electrical conductors. The optical connectors and optical receptacles disclosed are useful for blind mating (e.g., mating where it is difficult to see and/or access the mating interface) due to the magnetic retention and alignment features. Further, the optical connectors and optical receptacles enable optical connections that may have a relatively small and compact footprint so that they are useful for use with devices having small form-factors as well as large form-factors such as displays. Likewise, the complimentary optical receptacles may be used on electronic devices such as consumer devices, as well as other suitable applications such as docking stations and the like. For instance, electronic devices that may use the optical receptacle include smart phones, televisions, high-definition displays, laptops, tablets, docking stations and the like. One optical connector disclosed includes an optical body comprising at least one optical channel having an optical interface portion, a total internal reflection (TIR) surface for turning the optical signal of the at least one optical channel, and at least one fiber lead-in aligned to the TIR surface, one or more first magnetic materials attached to the optical body, and one or more second magnetic materials attached to the housing. The optical connector also includes a housing. The optical body may be integrally formed with a portion of the housing or may be a discrete component as desired. If the optical body is a discrete component it may be attached to a portion of the housing in a fixed manner or have a resilient mounting allowing movement. The optical body is used for receiving and/or transmitting optical signals and may optionally include one or more openings for receiving the one or more first magnetic materials that are used primarily for optical alignment. The one or more second magnetic materials are attached to the housing and used for providing a stronger retention force for the optical connector and for aiding with blind mating as appropriate.

As used herein, "magnetic material" or "magnetic materials" means a magnetic material or a ferrous material that is attracted to a magnet material. The magnetic material allows for quick and easy mating of the optical connection between the optical connector and the optical receptacle along with providing a robust and compact footprint for applications requiring a large number of mating/unmating cycles if needed. By way of example, a first side of an optical connection such as an optical connector may use a first magnet and a second side of the optical connection such as an optical receptacle may use a second magnet of opposite polarity for making an attachment between the first and second sides of the optical connection; alternatively, a first side of an optical connection such as optical connector may use a first magnet and a second side of the optical connection such as the optical receptacle may use a ferrous material for making an attachment between the first and second sides of the optical connection or vice versa.

Figure 1:
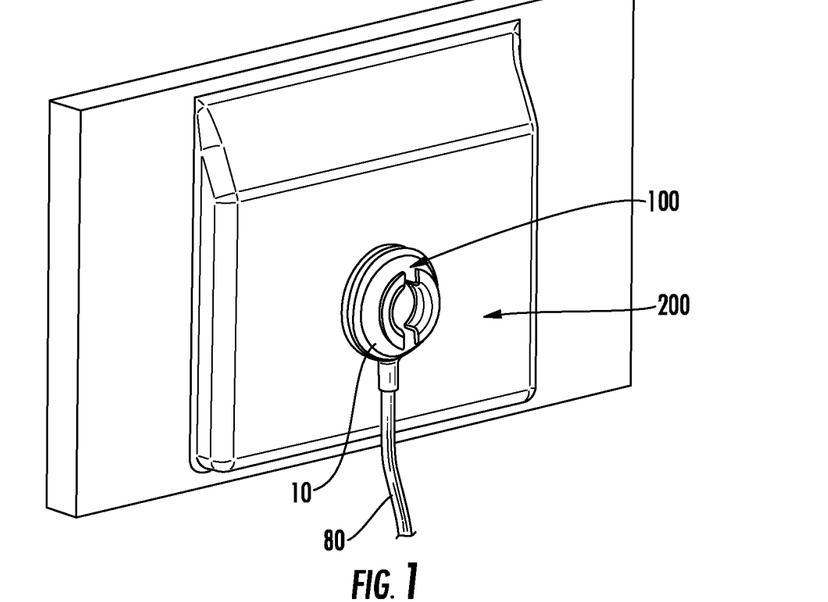
FIG. 1 is a perspective view of a cable assembly having an optical connector that is attached (e.g., mated) to an electronic device configured as a flat-panel display such as a television according the concepts disclosed herein.
Figure 2:
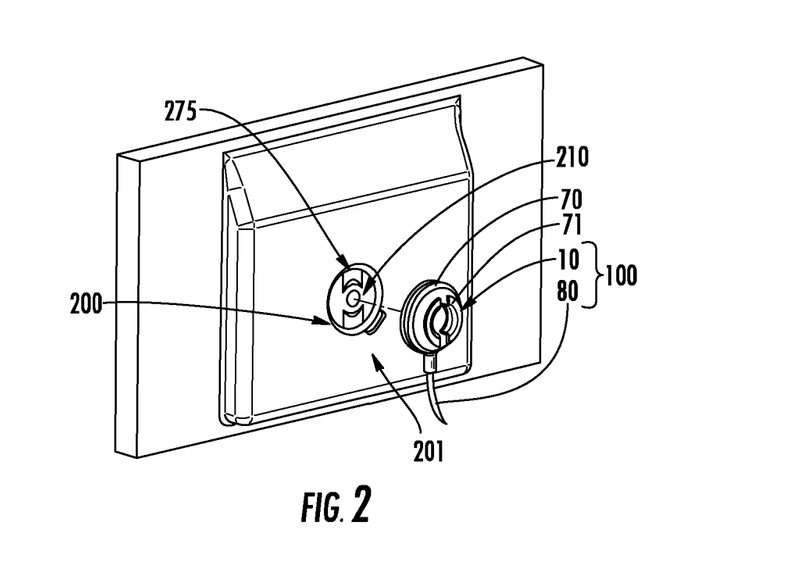
FIG. 2 is a perspective view showing the cable assembly and flat-panel display of FIG. 1 in an unmated condition.

FIG. 1 is a perspective detailed view of a cable assembly 100 that is used for making an optical connection when mated with a complementary electronic device 200 according the concepts disclosed herein. FIG. 2 is a perspective view showing the cable assembly 100 being aligned with the complimentary electronic device 200 in an unmated condition. Cable assembly 100 includes an optical connector 10 attached to a cable 80 having at least one optical fiber 82 (FIG. 3) and electronic device 200 includes an optical receptacle 210 for mating with optical connector 10. In this embodiment, the optical receptacle 210 is located at a backwall 201 of the electronic device such as a display or high-definition television which may make accessing the same difficult when closely mounted to a wall as is common-practice.

Figure 3:
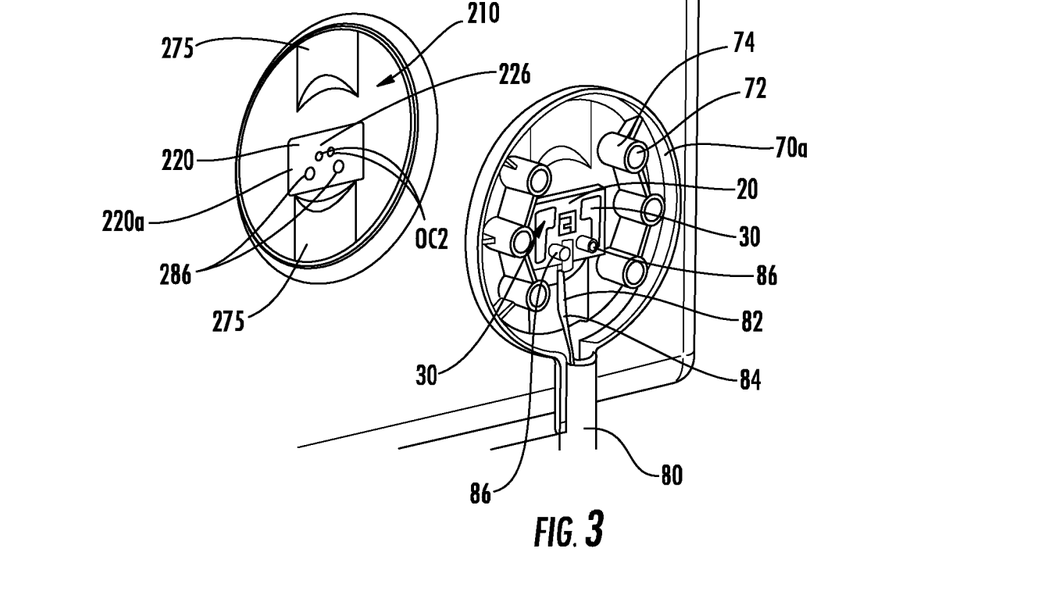
FIG. 3 is a detailed perspective view similar to FIG. 2 showing the optical connector of the cable assembly with a portion of the housing removed for showing assembly details of the optical connector.
Figure 4:
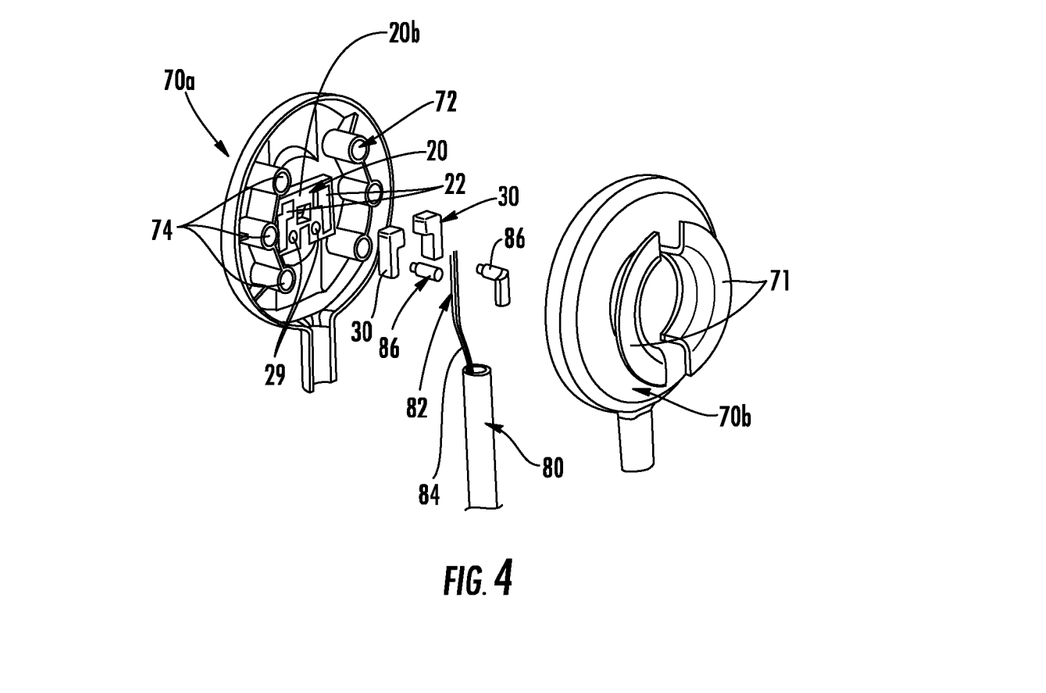
FIG. 4 is a partially exploded view of the optical connector of FIGS. 1 and 2 showing representative details of the construction.

FIGS. 3-9 show various views and details of optical connector 10 and/or optical receptacle 210. FIG. 3 depicts the optical connector 10 unmated from the optical receptacle 210 and with a portion of a housing 70 removed from optical connector 10 for showing details within the optical connector 10 and FIG. 4 is a partially exploded view of optical connector 10. Housing 70 of optical connector 10 has a first portion 70a and a second portion 70b and the second portion 70b of housing 70 is removed from the optical connector 10 shown in FIG. 3, thereby depicting internal details of the assembly. Housing 70 may also optionally include one or more ears 71 as a grip for installing/removing the optical connector 10. In this embodiment, an optical body 20 is integrally formed with a portion of housing 70. Specifically, the optical body 20 is integrally formed with first portion 70a of housing 70 such as in a molding operation. In other embodiments, the optical body 20 may be a discrete component separate from the housing 70 according to the concepts disclosed herein. Further, if optical body 20 is a discrete component from the housing 70 it may have a fixed attachment to a portion of the housing or it may have a floating attachment to a portion of the housing 70.

Figure 10:
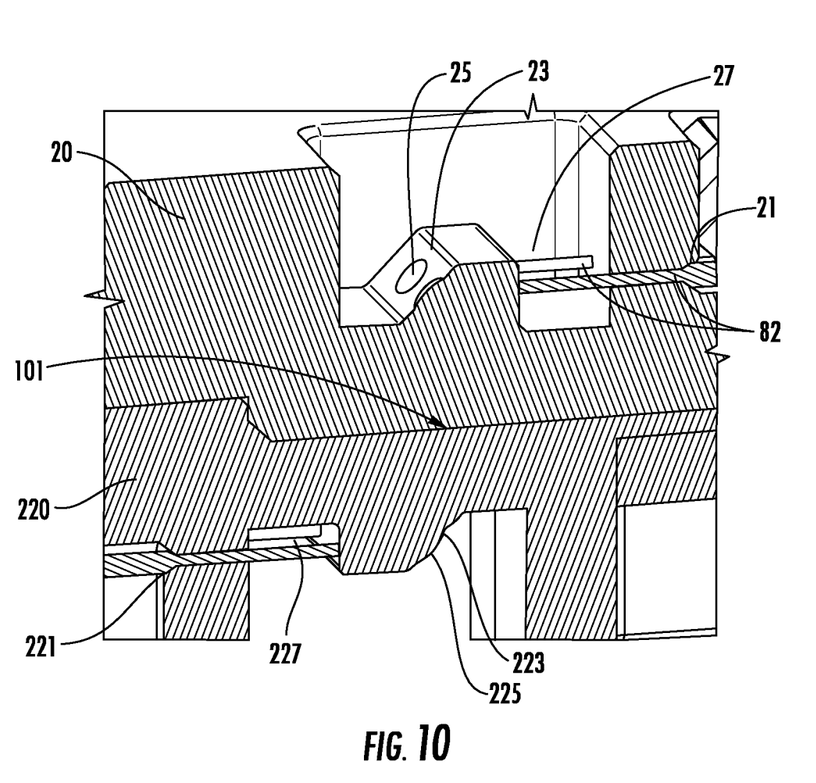
FIG. 10 is a cross-sectional view of the optical body of the optical connector and the optical body optical receptacle of FIG. 1 in a mated condition showing details of the optical pathways and mating interface.
Figure 11:
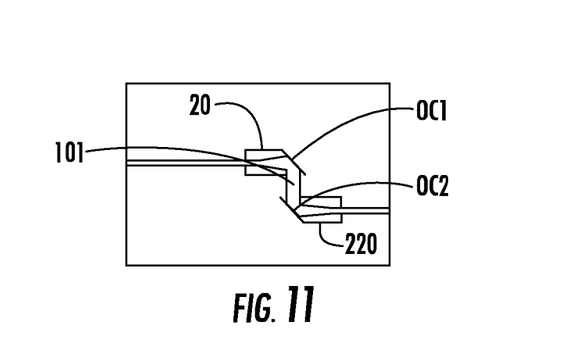
FIGS. 11 and 12 respectively are a schematic representation and ray trace of the optical path for the optical channels defined by the mating between the optical body of the optical connector and the optical body of the complimentary optical receptacle.
Figure 12:
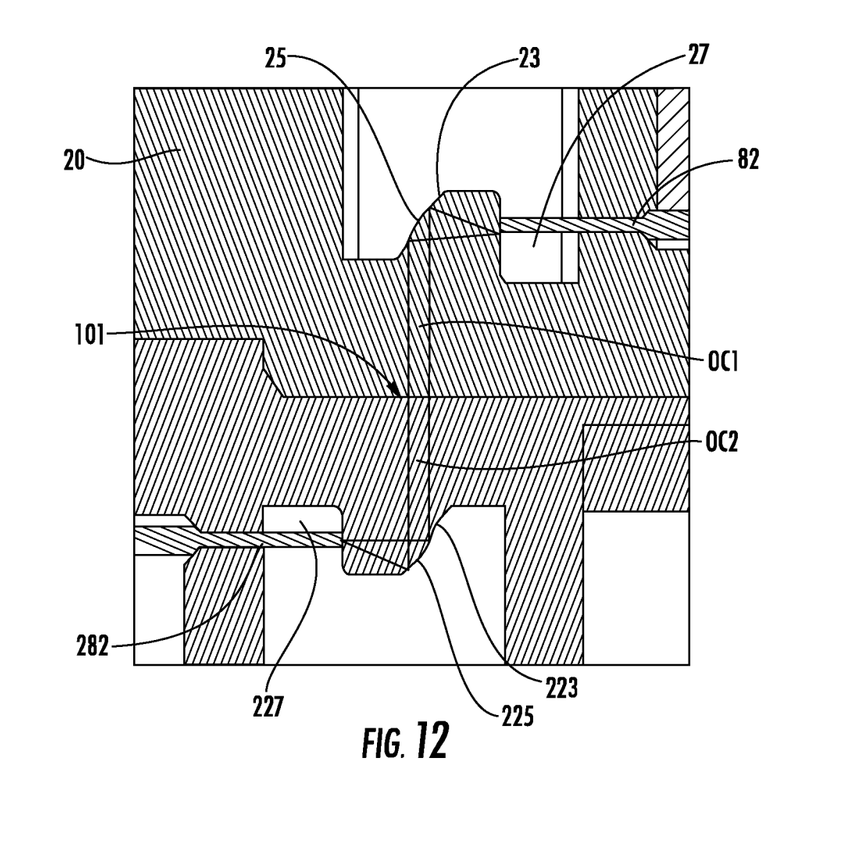

Optical connector 10 comprises an optical body 20 formed as a portion of housing 70 and optical receptacle 210 includes a complimentary receptacle optical body 220 (hereinafter optical body 220) that cooperate when mated together for making an optical connection as best shown in FIGS. 10-12. Optical body 20 comprises at least one optical channel OC1 having an optical interface portion 26 along with a total-internal reflection (TIR) surface 23 for turning the optical signal of the at least one optical channel OC1, and at least one fiber lead-in 21 aligned to the TIR surface 23. As shown in FIG. 3, the at least one optical fiber 82 of the cable 80 is attached to the optical body 20 so it is in optical communication with of optical connector 10. The optical receptacle 210 of electronic device 200 has a portion of optical body 220 exposed at the mating interface for cooperating with the exposed portion of optical body 20 of optical connector 10 when mated together. When the optical connector 10 of cable assembly 100 is attached to the optical receptacle 210 of electronic device 200 an optical connection is enabled between optical body 20 of the optical connector 10 and optical body 220 of optical receptacle 200 for optical communication at a mating interface 101.

FIG. 4 is a partially exploded view of cable assembly 100 showing details of optical connector 10 and cable 80. In this embodiment, optical connector 10 comprises optical body 20 integrally formed with a first portion 70a of housing 70, one or more first magnetic materials 30 for attachment to the optical body 20, and one or more second magnetic materials 74 that are attached to a portion of housing 70. As depicted in this embodiment, housing 70 further optionally comprises one or more second magnet pockets 72. Second magnetic material pockets 72 receive respective second magnetic materials 74 therein. Specifically, the second magnetic material pockets 72 are integrally formed with housing 70. Although second magnetic material pockets 72 are depicted on first portion 70a of housing 70, the pocket may be disposed on either the first portion 70a or second portion 70b of housing 70. Any suitable number of second magnetic materials may be used in any suitable arrangement for providing the desired retention force for the mated optical connection.

In this embodiment, optical connector 10 optionally includes one or more electrical contacts 86. Electrical contacts 86 may be any suitable type of electrical contact. Likewise, electrical contacts may be disposed in any suitable locations such as in the optical body or in the housing as desired. By way of example, the one or more electrical contacts maybe pogo pin electrical contacts disposed in one or more bores. In the embodiment shown, the electrical contacts 86 are disposed in bores 29 formed in the optical body 20. Cable 80 includes one or more optical fibers 82 and may optionally include one or more electrical conductors 84 such as copper wires. When assembled, the optical fibers 82 are optically attached to the optical body 20 and the electrical conductors 84 are electrically attached to electrical contacts 86.

Figure 5:
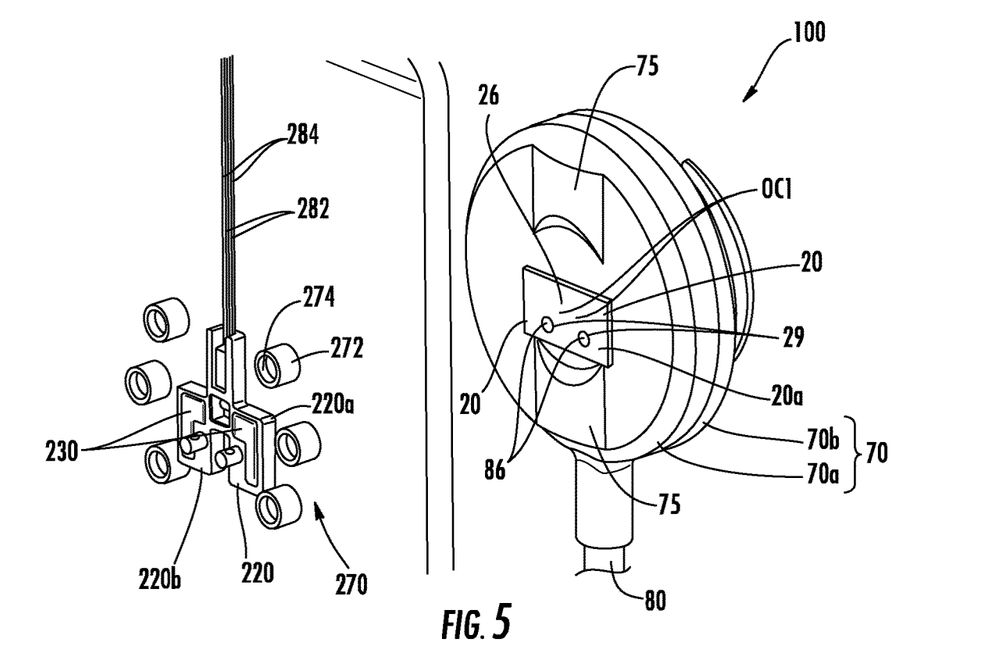
FIG. 5 is another detailed perspective view showing details of the optical receptacle and the mating side of the optical connector of FIGS. 1 and 2.

As shown in FIG. 5, optical body 20 includes at least one optical channel OC1 (FIG. 12) having an optical interface portion 26 disposed on a first side 20a. FIG. 5 also shows a rear-side perspective view of the optical receptacle 210. In this embodiment, optical body 20 is formed from a suitable material such as LEXAN that allows the transmission of optical signals therethrough at the desired wavelength. Optical body 20 includes two optical channels OC1, but the optical body 20 may include any suitable number of optical channels in any suitable arrangement or array as desired. In this configuration, optical body 20 includes an optional lens 25 on total internal reflection (TIR) surface 23 for manipulating the optical signal when turning the optical signal of the at least one optical channel 26 as shown in FIG. 10. However, other embodiments of the optical bodies may not use a lens at the TIR surface. The TIR surface 23 is formed by the different refractive indexes between the material of the optical body 20 and the air interface causing the optical signals to reflect and turn back into the optical body and continue along their optical path. Stated another way, the material/air interface causes the optical signal to turn within the optical body 20. Consequently, the TIR surface 23 can change the direction of travel for (e.g., turning) the optical signal(s). By way of example, the TIR surface 23 changes the direction of the optical channel OC1 from the direction aligned with the fiber lead-in 21 to a direction that is generally perpendicular to the fiber lead-in 21. Consequently, the optical connector can have a compact footprint for applications where an angled connector is advantageous; however, the concepts disclosed may be used with optical connectors having an in-line optical channel and omit the TIR surface as desired. The fiber lead-in 21 is used for receiving an optical fiber of cable 80 and aligning the fiber with the respective optical channel OC1 of the optical body 20.

In this embodiment, optical body 20 also includes one or more openings 22 for receiving one or more first magnetic materials 30 as best shown in FIG. 4. Openings 22 may have any suitable shape and/or size for receiving a respectively sized first magnetic material 30 therein. The one or more openings 22 may be disposed on any suitable side of the optical body 20 such as the same side as the optical interface portion 26, a side adjacent to the optical interface portion 26

(e.g., a short side), or a side opposite to the optical interface portion 26 as desired. In other embodiments, the first magnetic materials 30 may be attached to an outer side or periphery of the optical body 20. In this embodiment, the one or more openings 22 are disposed on a second side 20*b* of the optical body 20. The second side 20*b* being different than the first side 20*a* of the optical body 20. More specifically, optical body 20 has the first side 20*a* located on an opposite side from the second side 20*b*. Thus, the magnetic materials 30 may be inserted into the respective openings 22 from rear and secured in place.

As discussed herein, each of the first magnetic materials 30, 230 of optical bodies 20,220 or the second magnet materials 74,274 are respectively selected as a (1) magnet; or (2) a ferrous material that is attracted to a magnet so as to cooperate with the complimentary mating magnetic material disposed in the optical body or housing for providing a magnetic attractive force therebetween. For instance, the magnetic attractive force between the optical body 20 and optical body 220 aligns and holds the optical connection therebetween when mated and may be overcome with sufficient force for unmating the optical connection when desired. By way of example, the magnetic materials may be magnets with the desired pole, ferrous material that is attracted to a magnet, or combinations of magnets and ferrous materials. Magnetic materials may be secured with a friction fit, a mechanical fit, or an adhesive or the like as desired. Moreover, the openings 22 of optical body 20 need not extend to the first side 20*a* so that the first side 20*a* of optical body 20 may have a generally flush surface at the first side 20*a* about the magnetic material 30; however, the opening could extend to the first side 20*a* if desired. Consequently, the first side 20*a* (i.e., the mating surface) may have a smooth appearance about the magnetic material locations for aesthetics and/or inhibiting adhesive from reaching the first side 20*a* of optical body 20 having the optical interface portion 26.

The optical body 20 may have any suitable number of openings 22 arranged in any suitable pattern for receiving the first magnetic material. In this particular embodiment, the one or more openings 22 of optical body 20 are two L-shaped openings arranged on the second side 20*b* of the optical body 20; however, other suitable shapes and/or arrangements are possible. By way of example, the optical body could have two rectangular or circular openings disposed on opposite sides of the optical interface portion 26 for the first magnetic materials 30 if desired. When optical body 20 of optical connector 10 is mated to the optical receptacle 200 as shown in FIG. 1, the first magnetic materials 30 of the optical body 20 are attracted to complimentary second magnetic materials 230 (FIG. 5) of optical body 220 of a complimentary electronic device 200. Further, the first magnetic materials 30,230 may have slightly different sizes and/or shapes so that the assembly of components may only occur in one orientation and avoid issue with attractive forces.

Optical body 20 can have any suitable arrangement relative to housing 70 as desired. As shown, the optical body 20 is integrally formed with a portion of housing 70 such as first portion 70*a*; however, other embodiments are possible where the optical body 20 is a discrete component. For instance if optical body 20 is a discrete component, then optical body 20 may be fixed to housing 70 so that movement is inhibited such as a mechanical fit or securing with an adhesive. In other arrangements, optical body 20 may have a floating or bias arrangement to allow some limited movement of the optical body 20 during mating if it is a discrete component. By way of example, the optical body 20 may be biased to a forward position using one or more resilient members and be allowed to move rearward a few millimeters. As examples, the resilient member may be one or more leaf springs, a wave washer or other suitable components for biasing and allowing small movements of the optical body. Likewise, optical body 220 could have similar mounting arrangements in the optical receptacle.

As discussed, the optical bodies 20,220 may have solely an optical interface or optionally have a hybrid optical and electrical interface if desired. Illustratively, optical body 20 further includes one or more bores 29 adjacent to the optical interface portion 26 for receiving one or more electrical contacts 86. In optical body 20 and optical body 220, the bores 229 are located at outboard sides of the optical interface portions 26 and 226 and are arranged to provide physical contact between respective electrical contacts when mated together. In this case, optical body 20 includes two bores 29, but any suitable number of bores is possible. Optical bodies may use any suitable type of electrical contacts as desired. By way of example, optical body 20 has one or more pogo pin electrical contacts disposed in the one or more bores 24. The electrical contacts may be used for power and/or data transmission as desired. The electrical contacts are electrically connected to electrical conductors of cable 80 for the cable assembly 100 or electrically connected to the circuit board of the electronic device for the optical port.

Additionally, optical connector 10 and/or the optical receptacle 210 may further optionally include one or more alignment features for keying and/or gross alignment during mating. Moreover, the respective alignment features of the optical connector 10 and optical receptacle 210 may be complimentary in nature. As shown in FIG. 3, optical receptacle has alignment features 275 disposed above and below optical body 220. In this embodiment, the alignment features 275 of optical receptacle 210 are shaped recesses formed in the housing that may be symmetric or asymmetric as desired. Alignment features 275 cooperate with alignment features 75 that are disposed on a portion of housing 70. Specifically, portion 70*a* of housing 70 includes complimentary protrusions 75 on opposite sides of optical body 20 for cooperating with alignment features 275 of optical receptacle 210. Of course, the placement of the recesses and protrusion may be reversed between the optical connector 10 and optical receptacle 210 as desired or with any other complementary alignment features. Other suitable alignment features are possible such as other types of protrusions, castellations, alignment pins and holes, or the like disposed in the housing or optical bodies as desired.

As shown in FIG. 10, optical body 20 may optionally include a well 27 that opens to the at least one fiber lead-in 21. The well 27 is located at a position where it may receive a suitable index-matching material such as an adhesive for securing the one or more optical fibers of the cable 80 to the optical body 20. Further, the well 27 may be arranged so that is open to multiple fiber lead-ins 21 and may receive the adhesive for securing all of the optical fibers to the optical body 20. Optical bodies may also optionally include one or more lenses (not numbered) on other surfaces as part of the optical channel of the optical body as desired. The one or more lenses may be arranged at any suitable location on the optical body 20 besides the TIR surface 23, but other suitable locations are possible.

Figure 6:
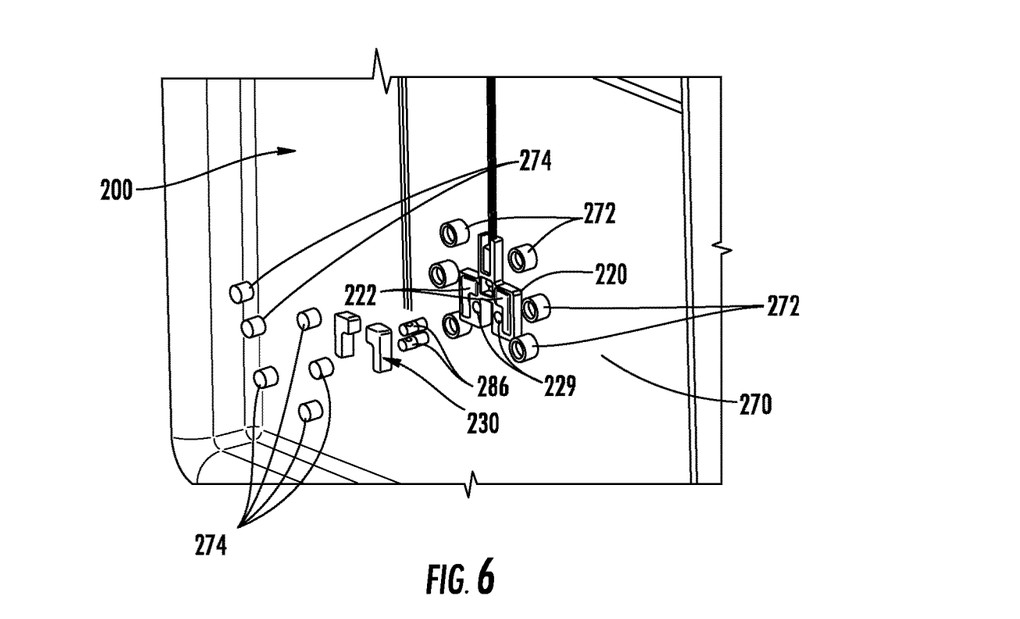
FIG. 6 is a partially exploded view of the optical receptacle of FIGS. 1 and 2 showing representative details of the construction.

FIG. 6 is a partially exploded view of the optical receptacle 210 from the rear-side (e.g., from inside the electronic device 200). Optical receptacle 210 comprises optical body 220 having at least one optical channel OC2 having an optical interface portion 226, one or more first magnetic materials 230 attached to the optical body 220, a housing 270, and one or more second magnetic materials 274 attached to the housing 270.

The optical receptacle 210 may also optionally include one or more electrical contacts 286. Like the optical connector 10, electrical contacts 286 may be any suitable type of electrical contact. Likewise, electrical contacts may be disposed in any suitable locations such as in the optical body or in the housing as desired. By way of example, the one or more electrical contacts maybe pogo pin electrical contacts disposed in one or more bores. In the embodiment shown, the electrical contacts 286 are disposed in bores 229 formed in the optical body 220 to cooperate with electrical contacts 86 of optical connector 10. When assembled, the optical fibers 282 of the electronic device 200 are optically attached to the optical body 220 and the electrical conductors are electrically attached to electrical contacts 286.

Figure 7:
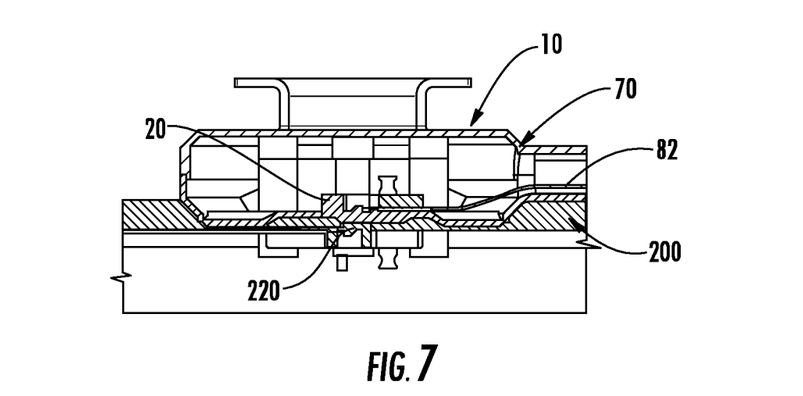
FIG. 7 is a cross-sectional view of the optical connector and the optical receptacle of FIG. 2 in a mated condition generally taken along the optical axis of the optical connector.

Optical body 220 of optical receptacle 210 is a portion of electronic device 200. Optical body 220 is attached to housing 270 of optical receptacle in a suitable manner for the desired application such as discussed with optical body 20. As shown in FIG. 7, optical body 220 is similar to optical body 20, and includes many of the same features for the same purposes such as a TIR surface 223, a fiber lead-in 221 and a well 227; however, other variations could have an optical body 220 provides optical communication by way of in-line optical channel that is in optical communication with one or more active components.

Stated another way, although optical body 220 is shown having optical channels that turn the optical signals with optical fibers attached thereto and in optical communication therewith, other embodiments of the optical body in optical communication with active components are possible using the concepts disclosed. If optical body 220 has in-line optical channels in optical communication with one or more active components, instead of turning the optical signals, then optical body 20 of optical connector 10 may have a floating attachment to accommodate the fixed optical body 220. In other words, if an optical body has one or more in-line optical channels they are aligned with active components disposed on the circuit board. On the transmit channels active components such as vertical-cavity side-emitting lasers (VCSELs) or laser diodes transmit optical signals to the optical body and on receive channels active components such as photodiodes receive optical signals from optical body. However, other embodiments may have all transmit or all receive channels if desired. Thus, the optical signals transmitted to the optical receptacle may be converted into electrical signals and vice versa for transmitting signals to and from a complimentary electronic device that is optically connected to a cable assembly or the like.

In this embodiment, the optical body 220 of the optical receptacle 210 has an optical channel OC2 that directs the optical signals to optical fibers 282 by way of TIR surface 223. Further, optical body 220 may optionally include one or more lenses 225 on the TIR surface 223 or in other locations as desired. If used, the one or more lenses of the optical body may be used for collimating or focusing the optical signal.

As discussed, optical body 220 cooperates with optical body 20 for providing an optical connection at the mating interface 101 between the optical bodies 20,220 when coupled (e.g., mated) together. Optical body 220 has at least one optical channel 235 having an optical interface portion 226 on a first side 220a and one or more openings 222 on a second side 220b for receiving one or more first magnet materials 230.

For instance, optical body 220 may include a retaining feature 239 such as a flange for positioning the optical body 220 relative to the faceplate 6, thereby inhibiting forces from disturbing the optical body alignment with the active components 8 on the circuit board 7 of the electronic device 5. When assembled and installed, the optical body 220 is a portion of the electronic device 5.

Like optical body 20, optical body 220 is formed from a suitable material such as LEXAN that allows the transmission of optical signals therethrough at the desired wavelength. Like complimentary optical body 20, optical body 220 includes two optical channels 226, but the optical body 220 may include any suitable number of optical channels in any suitable arrangement or array as desired, and is typically matched to the complementary optical body for optical communication. Optical body 220 may also optionally include one or more openings 222 for receiving one or more first magnetic materials 230 as best shown in FIG. 5. As with optical body 20, openings 222 of optical body 220 may have any suitable shape and/or size for receiving a respectively sized first magnetic material 230. The one or more openings 222 may be disposed on any suitable side of the optical body 220 such as the same side as the optical interface portion 226, a side adjacent to the optical interface portion 226 (e.g., a short side), or a side opposite to the optical interface portion 226 as desired. In this embodiment, the one or more openings 222 are disposed on a second side 220b of the optical body 220 with the second side 220b being different than the first side 220a of the optical body 220. More specifically, optical body 220 has the first side 220a located on an opposite side from the second side 220b. Thus, the first magnetic materials 230 may be inserted into the respective openings 222 from the second side 220b. Moreover, since the first magnetic materials 30,230 are not exposed at the first sides 20a,220a of respective optical bodies 20,220 the first magnetic materials 30,230 may be protected from environmental effects such as inhibiting corrosion and allowing easier cleaning of the respective first sides. In this particular embodiment, the one or more openings 222 of optical body 220 are two L-shaped openings arranged on the second side 220b to cooperate with optical body 20; however, other arrangements are possible such as rectangular or circular. Further, the optical bodies may include one or more coatings such as anti-reflection or anti-scratch coatings if desired.

Optical receptacle 210 also includes a housing 270. Housing 270 may be integrally formed with a portion of electronic device 200 or be formed as a discrete component such as a panel or module that drop-fits into an opening of the electronic device 200 as desired. The housing further optionally comprises one or more second magnet pockets 272. Second magnetic material pockets 272 receive respective second magnetic materials 274 therein. Specifically, the second magnetic material pockets 272 are integrally formed with housing 270. The housing 270 may have any suitable number of second magnetic materials with any suitable arrangement for providing the desired retention force for the mated optical connection.

Figure 8:
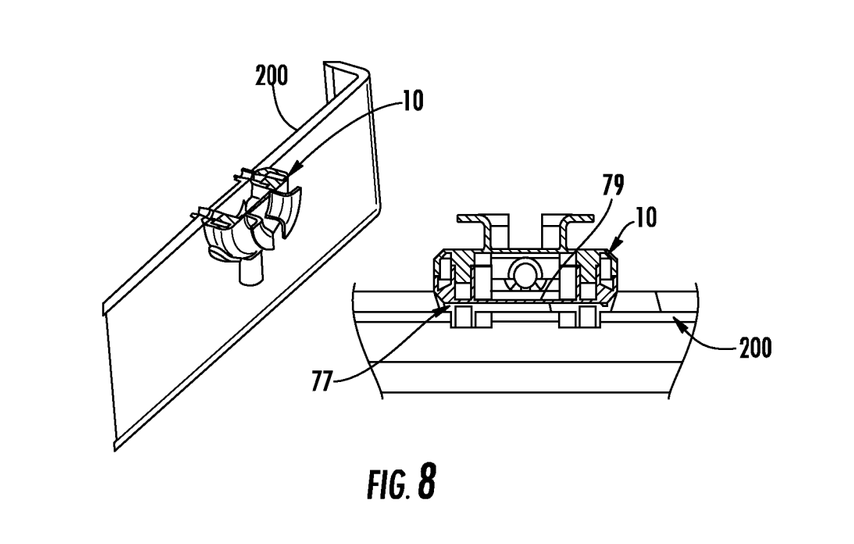
FIG. 8 is a cross-sectional view of the optical connector and the optical receptacle of FIG. 2 in a mated condition generally taken perpendicular to the optical axis of the optical connector.
Figure 9:
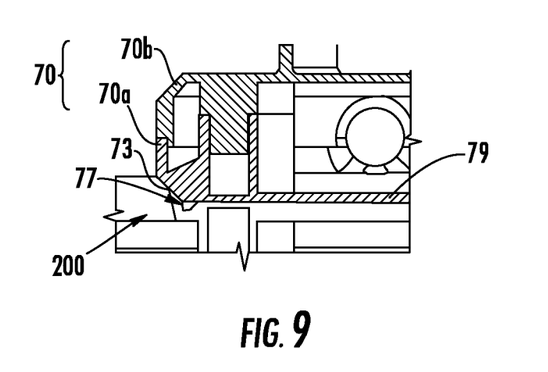
FIG. 9 is a detailed cross-sectional view of the optical connector and the optical receptacle of FIG. 2 in a mated condition showing a portion of the mating interface therebetween.

FIGS. 7-9 depict various cross-sectional views of the optical connector 10 mated to optical receptacle 210. FIG. 7 is a cross-sectional view generally taken along the optical axis of the optical connector, FIG. 8 is a cross-sectional view generally taken perpendicular to the optical axis of the optical connector near the center line, and FIG. 9 is a cross-section showing details of an optional moat feature 77 disposed near the base of and an optional chamfer 73 of housing 70. The chamfer 73 aids in guiding and centering the optical connector 10 with the optical receptacle 210 during mating and the moat feature 77 an area for dirt and debris to collect and inhibit collection on the optical interface 26. The housing 70 also includes an optional floor recess 79. Floor recess 79 is configured to be slightly below the mating surface such as 25 to 50 microns for allowing an area for any dirt or debris to collect and inhibits it from interfering with the mating between the optical connector 10 and optical receptacle 210. Moreover, the structure of the optical connector 10 and optical receptacle 210 allow access for the user to easily clean the optical interfaces 26,226 when needed.

In other embodiments, the optical interface portions 26,226 may have a cover that is attached to the optical body 20, 220 and lenses that are integrally molded into the respective optical bodies 20,220 if desired. Cover may be any suitable materials such as a polymer or glass composition that allows the transmission of optical signals therethrough. Moreover, cover may include any suitable coating(s) as desired.

Figure 13:
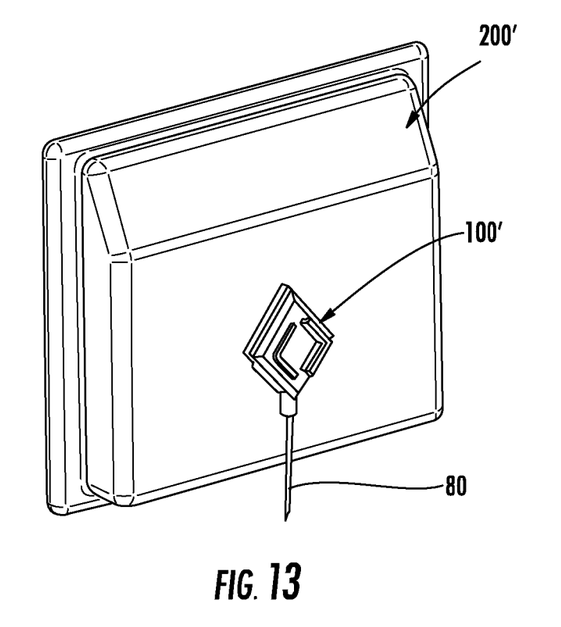
FIG. 13 is a perspective view of another cable assembly having an optical connector that is attached (e.g., mated) to an electronic device such as a flat-panel display such as a television having a complimentary optical receptacle according the concepts disclosed herein.
Figure 14:
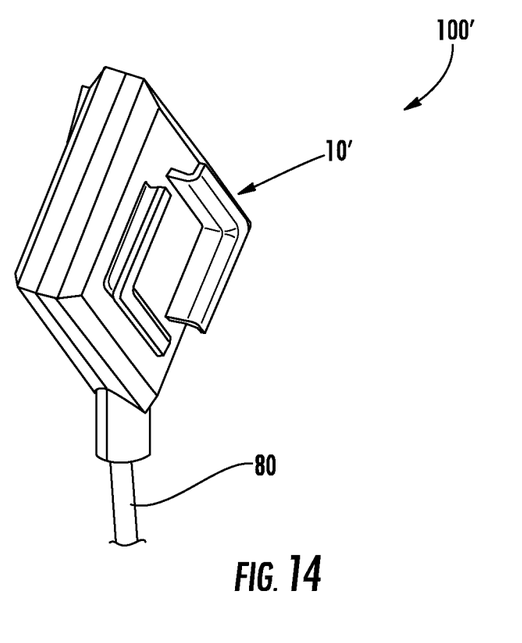
FIG. 14 is a perspective view showing the alternative embodiment of the optical connector according to the concepts disclosed herein.
Figure 15:
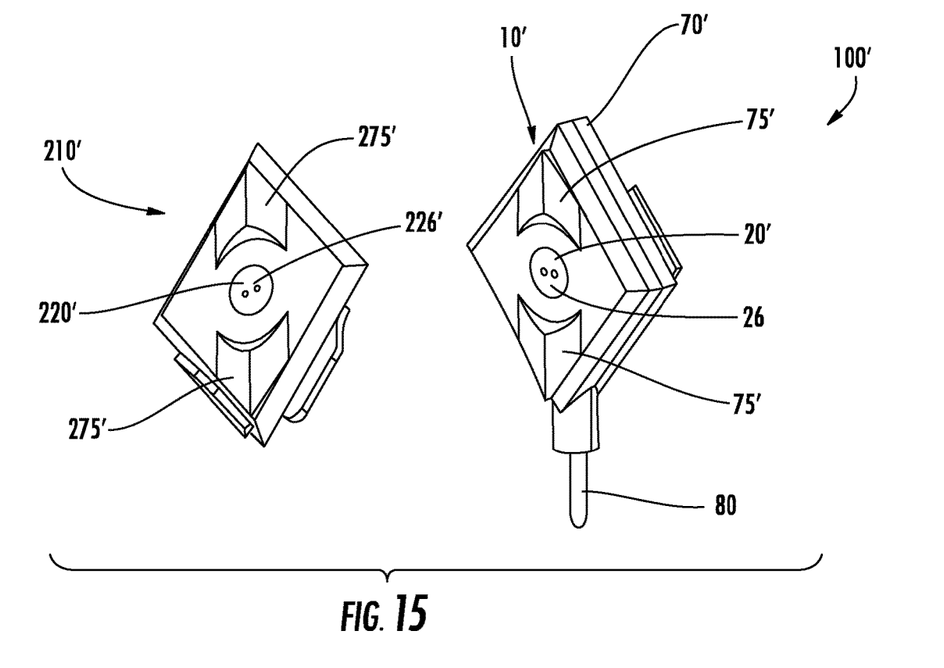
FIG. 15 schematically depicts the mating interface between the optical connector of FIGS. 13 and 14 along with its complimentary optical receptacle for an electronic device.

Optical connector and optical receptacles can have other configurations and/or shapes according the disclosed concepts. FIGS. 13-15 depict another optical connector 10' and another complimentary optical receptacle 210' that are similar to optical connector 10 and optical receptacle 210, but that have different shapes. FIG. 13 is a perspective view of another cable assembly 100' that is similar to cable assembly 100, having an optical connector 10' that is attached (e.g., mated) to an electronic device 200' having a complimentary optical receptacle 210' according the concepts disclosed herein.

As shown in FIG. 14, optical connector 10' has a rectangular or diamond shape instead of round shape like optical connector 10.

FIG. 15 depicts the mating interfaces of optical connector 10' optical receptacle 210', which are functionally the same as optical connector 10' and optical receptacle 210' so the details will be omitted for brevity. In this embodiment, optical body 20' and complementary optical body 220' are configured as generally round elements at the optical interface portions 26',226'. However, the shapes of the optical bodies 20',220' could be rectangular with only a round portion at the optical interface portions 26',226'. Additionally, the housing 70' of the optical connector 10' and housing 270' of optical receptacle 210' have rectangular or diamond shapes that are complimentary. Likewise, the housings 70' and 270' have respective alignment features 75',275' that are complimentary in nature.

The disclosure is also directed to method for making an optical devices such as optical connectors or optical receptacles according to the concepts disclosed. One explanatory method of making an optical device comprises providing an optical body comprising at least one optical channel with an optical interface portion, providing one or more first magnetic materials, attaching one or more of the first magnetic materials to the optical body, providing a housing and one or more second magnetic materials, and attaching the one or more second magnetic materials to a portion of the housing. The method may also optionally include the step of providing a housing with one or more alignment features, attaching one or more electrical contacts to the optical body, and/or having the optical body being a portion of an optical connector or an optical receptacle. Additionally, the method may also optionally further include the step of providing a housing having one or more second magnet recesses.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical device, comprising:
    a connector housing comprising:
       a first portion comprising one or more magnetic pockets for receiving one or more second magnetic materials; and
       a second portion coupled to the first portion, wherein the connector housing comprises one or more alignment features configured as protrusions; and
    an optical body integrally formed with the first portion of the connector housing, the optical body comprising:
       at least one optical channel having an optical interface portion,
       a total internal reflection (TIR) surface for turning the optical signal of the at least one optical channel,
       at least one fiber lead-in aligned to the TIR surface, wherein the optical body forms a portion of the connector housing for directly mating with an complimentary device, and
       one or more openings for receiving one or more first magnetic materials.

2. The optical device of claim 1, further comprising the one or more first magnetic materials within the one or more openings of the optical body.

3. The optical device of claim 1, further including one or more electrical contacts.

4. The optical device of claim 3, the one or more electrical contacts being one or more pogo pin electrical contacts disposed in one or more bores.

5. The optical device of claim 4, the one or more bores for the electrical contacts being formed in the optical body.

6. The optical device of claim 1, further including a lens as a portion of the at least one optical channel.

7. The optical device of claim 1, wherein the optical interface portion is on a first side of the optical body and the one or more openings are on a second side of the optical body.

8. The optical device of claim 7, wherein the first side is located on an opposite side from the second side.

9. The optical device of claim 1, the optical body further including a well that opens to the at least one fiber lead-in.

10. The optical device of claim 1, the optical connector being a portion of a cable assembly.

11. An optical connector, comprising:
    a connector housing comprising one or more magnetic pockets and one or more alignment features configured as protrusions; and
    an optical body integrally formed with the connector housing, and comprising at least one optical channel having an optical interface portion, a total internal reflection (TIR) surface for turning the optical signal of the at least one optical channel, at least one fiber lead-in aligned to the TIR surface, and one or more openings;
one or more first magnetic materials within the one or more openings of the optical body; and
one or more second magnetic materials within the one or more pockets of the connector housing.

12. The optical connector of claim 11, further including one or more electrical contacts.

13. The optical connector of claim 12, the one or more electrical contacts being one or more pogo pin electrical contacts disposed in one or more bores.

14. The optical connector of claim 13, the one or more bores for the electrical contacts being formed in the optical body.

15. The optical connector of claim 11, further including a lens as a portion of the at least one optical channel.

16. The optical connector of claim 11, wherein the optical interface portion is on a first side of the optical body and the one or more openings are on a second side of the optical body.

17. The optical connector of claim 16, wherein the first side is located on an opposite side from the second side.

18. The optical connector of claim 11, the optical body further including a well that opens to the at least one fiber lead-in.

19. The optical connector of claim 11, the optical connector being a portion of a cable assembly.

20. An optical receptacle, comprising:
a receptacle optical body comprising at least one optical channel having an optical interface portion and one or more openings;
one or more first magnetic materials within the one or more openings of the optical body;
a housing comprising one or more magnetic pockets and one or more alignment features; and
one or more second magnetic materials within the one or more magnetic pockets of the housing.

21. The optical receptacle of claim 20, the receptacle optical body further comprising a total internal reflection (TIR) surface for turning the optical signal of the at least one optical channel.

22. The optical receptacle of claim 20, further including one or more electrical contacts.

23. The optical receptacle of claim 22, the one or more electrical contacts being one or more pogo pin electrical contacts disposed in one or more bores.

24. The optical receptacle of claim 23, the one or more bores for the electrical contacts being formed in the receptacle optical body.

25. The optical receptacle of claim 20, further including a lens as a portion of the at least one optical channel.

26. The optical receptacle of claim 20, wherein the optical interface portion is on a first side of the receptacle optical body and the one or more openings are on a second side of the receptacle optical body.

27. The optical receptacle of claim 26, wherein the first side is located on an opposite side from the second side.

28. The optical receptacle of claim 20, the housing comprising one or more alignment features.

29. The optical connector of claim 20, the optical receptacle being a portion of an electronic device.

30. The optical connector of claim 1, wherein the one or more openings are L-shaped openings.

31. The optical connector of claim 1, wherein the first portion of the housing comprises one or more ears as a grip for installing and removing the optical connector.

32. The optical connector of claim 1, wherein the second portion comprises a chamfer and a moat feature.

33. The optical connector of claim 11, wherein the optical body is biased forward with respect to the housing.

34. The optical connector of claim 11, wherein the one or more openings of the optical body are L-shaped.

* * * * *

UNITED STATES PATENT AND TRADEMARK OFFICE
CERTIFICATE OF CORRECTION

PATENT NO.        : 10,191,228 B2                           Page 1 of 1
APPLICATION NO.   : 15/460315
DATED             : January 29, 2019
INVENTOR(S)       : Micah Colen Isenhour et al.

It is certified that error appears in the above-identified patent and that said Letters Patent is hereby corrected as shown below:

In the Claims

In Column 14, Line 23, Claim 29, delete "connector" and insert -- receptacle --, therefor.

Signed and Sealed this
Third Day of September, 2019

Andrei Iancu
*Director of the United States Patent and Trademark Office*